US005102484A

United States Patent [19]

Allen et al.

[11] Patent Number: 5,102,484

[45] Date of Patent: Apr. 7, 1992

[54] METHOD AND APPARATUS FOR GENERATING AND DEPOSITING ADHESIVES AND OTHER THERMOPLASTICS IN SWIRLS

[75] Inventors: Martin A. Allen; John T. Fetcko, both of Dawsonville, Ga.

[73] Assignee: J&M Consultants Inc., Gainesville, Ga.

[21] Appl. No.: 544,266

[22] Filed: Jun. 26, 1990

[51] Int. Cl.[5] .............................................. B29C 47/12

[52] U.S. Cl. .......................... 156/244.11; 156/244.23; 156/244.24; 156/500; 264/176.1; 264/177.1; 239/298; 239/399; 239/406; 239/418; 425/7; 425/72.1; 425/72.2

[58] Field of Search ...................... 156/244.11, 244.23, 156/244.24, 500; 239/90, 298, 399, 403, 405, 406, 416, 421, 423, 433, 463, 470, 600; 425/7, 72.2, 72.1; 118/302, 320, 324, 410; 264/176.1, 177.1

[56] References Cited

U.S. PATENT DOCUMENTS 3,501,802 3/1970 Ullman et al. .......................... 425/7
4,098,632 7/1978 Sprague .............................. 156/295
4,416,600 11/1983 Lecznar et al. .......................... 425/7
4,785,996 11/1988 Ziecker et al. ....................... 239/406
4,815,660 3/1989 Boger ................................. 239/418
4,969,602 11/1990 Scholl ................................. 239/406
4,983,109 1/1991 Miller et al. ......................... 239/298

FOREIGN PATENT DOCUMENTS 909427 10/1962 United Kingdom ................ 239/298

*Primary Examiner*—Caleb Weston
*Attorney, Agent, or Firm*—Robert Graham

[57] ABSTRACT

A nozzle assembly and method for delivering swirls of a thermoplastic melt to a substrate operate on the principle of contacting a thermoplastic spun filament with swirling air to impart a circular swirling expanding cone pattern to the filament. The swirling filament is deposited on a substrate or collector as circular beads.

23 Claims, 4 Drawing Sheets

METHOD AND APPARATUS FOR GENERATING AND DEPOSITING ADHESIVES AND OTHER THERMOPLASTICS IN SWIRLS

BACKGROUND OF THE INVENTION

This invention relates broadly to an apparatus and method for applying a thermoplastic bead in a circular pattern. In one aspect the invention relates to method and apparatus for applying liquid adhesives, particularly hot melted adhesives.

In many operations, it is desirable to apply a bead of a thermoplastic adhesive to a substrate to bond materials to the substrate. Examples of such uses are disclosed in U.S. Pat. No. 4,798,163 which relates to a slit nozzle for application of hot melt adhesives. U.S. Pat. No. 4,711,683 discloses method and apparatus for applying elastic bands or ribbons to a thermoplastic web.

The patterns of the bead applied may range from a wide ribbon as disclosed in U.S. Pat. No. 4,798,163 to a zig-zag pattern as disclosed in U.S. Pat. No. 4,711,683.

In some applications it is also desirable to apply the bead in a circular or oval pattern to effect uniform distribution of the polymer onto the substrate. Applicators constructed in accordance with U.S. Pat. No. 3,634,573 may be adapted to apply a circular bead on the substrate. This design operates on the principle of a single thermoplastic adhesive filament being extruded through a nozzle while a plurality of hot air streams are angularly directed onto the extruded filament to impart a circular motion thereto. The filament thus assumes an expanding swirling cone shaped pattern in moving from the extrusion nozzle to the substrate. As the substrate is moved linearly with respect to the stationary nozzle, a circular bead is continuously deposited on the substrate, each circular cycle being displaced from the previous cycle by a small amount in the direction of substrate movement.

As indicated above, the swirling, expanding circular pattern is achieved by gas streams impinging upon the extruded polymer. References which disclose apparatus for applying a plurality of gas streams to extruded thermoplastic or glass materials include U.S. Pat. No. 3,634,573, U.S. Pat. No. 4,135,903, U.S. Pat. No. 4,243,400, U.S. Pat. No. 4,211,736, and U.S. Pat. No. 4,548,632.

U.S. Pat. No. 4,891,249, disclosed a spray nozzle for generating fibers or filaments. These generated fibers and filaments are not swirled. For reasons described in detail below, the generation of the filament and swirls offer significant advantages.

SUMMARY OF THE INVENTION

An important feature of the present invention is the generation and collections of a thermoplastic filament in a circular loop or swirling pattern. The nozzle assembly of the present invention is not only capable of achieving the desired pattern but does so at rates (i.e. loops per second) not possible with prior art nozzles.

Although the concepts embodied in the present invention have applications in a variety of industrial systems, including the manufacture of nonwovens (by meltblowing on spunbond processes), glass and thermoplastic spinning, coatings with thermoplastics, and the like, the present invention has particular utility in the application of adhesives to substrates. In this operation, it is important that the adhesive be applied uniformly and at a relatively high rate. The circular pattern (overlapped loops) is particularly suitable for adhesive service because it permits the use of a single filament bead (or plurality of beads in side-by-side arrangement) and provides uniform coverage. Moreover, the amount of adhesive can be controlled by the degree of draw down of the filament, the loops per second, and the speed of the substrate.

The nozzle assembly operates on the principle melt spinning a material to form a single filament and contacting the filament with gas (e.g. air) to impart a swirling motion to the filament and stretch (draw down) the filament. The swirling and stretched filament is collected on a collector or substrate.

The nozzle assembly comprises a nozzle insert member and companion cap member which define (a) the polymer flow passage and orifice and (b) the air chambers and passages. Key features of the combination is an air chamber, a primary cone shaped annular air passage and surrounding secondary air passages. The continuous annular air passage (primary air passage) encircles the spinning orifice and serves to deliver converging air for contacting the molten thermoplastic monofilament. The secondary air passage spaced about the periphery of the continuous primary air passage deliver directed air jets to contact the swirling filament.

As polymer is extruded through the orifice spinning a monofilament, air is flowed into the annular chamber in a swirling motion about the central axis of the chamber. The air flows from the annular chamber through the primary passage in a swirling motion and contacts the extruded filament a short distance below the orifice outlet. This imparts a whirling or spinning motion to the filament which expands as a spiral in the form of an expanding cone. The air from the annular chamber also flows through the plurality of secondary flow passages discharging as directed jets. These jets contact the swirling filament at a plurality of circumferential and tangential locations. The secondary air passages are directed so that the air jets have a directional component in the same direction as the swirling filament to increase the velocity of the filament and further stretch and draw it down.

The swirling filament thus passes from the orifice to the substrate in the general form of an expanding spiral which defines a cone. The filament is laid down on a moving substrate (or collector) in the form of circular overlapped loops.

The method of the present invention thus features contacting the extruded filament with a swirling air flow from a continuous annular air passage to impart swirling and expanding spiral flow pattern to the filament and thereafter contacting the whirling filament with a plurality of air jets focused to accelerate the filament and further draw it down prior to deposition on the substrate. The air jets also provide an outer boundary for the swirling filament.

The method and nozzle assembly of the present invention achieves two important results: (a) increased velocity and increased drawdown on the filament and (b) dimensional stability on the loops resulting from the boundary effect of the secondary air jets.

DESCRIPTION OF THE PREFERRED EMBODIMENTS

Figure 1:
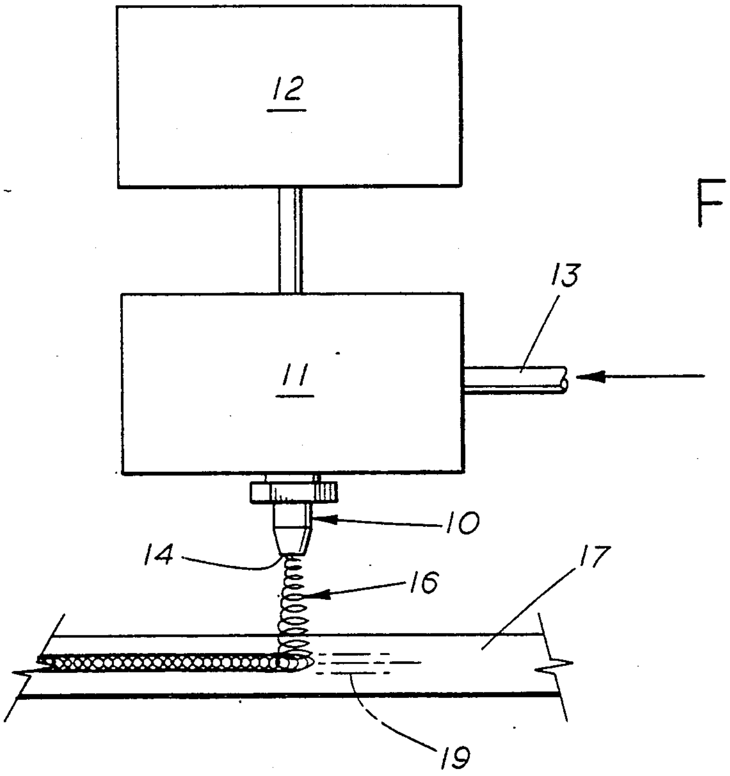
FIG. 1 is a schematic view of a system equipped with the nozzle constructed according to the present invention.

With reference to FIG. 1, a nozzle assembly 10 constructed according to the present invention is shown mounted on block 11 which is connected to a polymer deliver system such as an extruder 12 and to an air source via line 13. The mounting block 11 is provided with suitable passages described in more detail below for delivering the polymer melt and air to the nozzle assembly 10. (Although the present invention may employ other gases, air is preferred and will be referred to in the description herein.)

Figure 2:
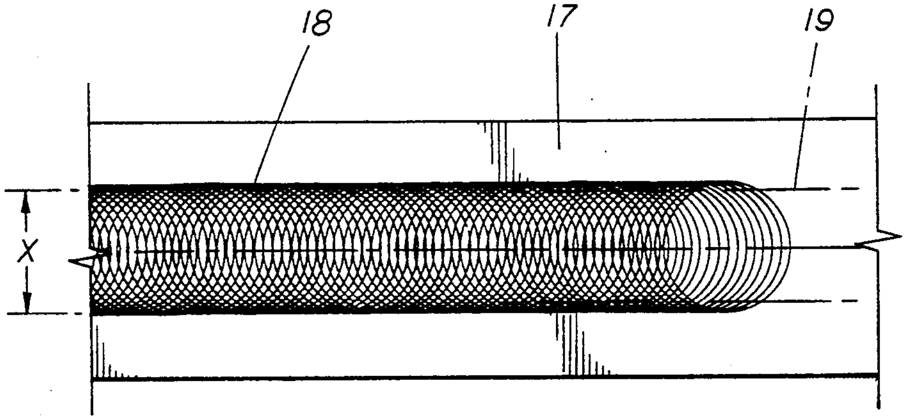
FIG. 2 is a plan view of the thermoplastic bead deposited on a substrate illustrating the pattern of deposition.

Briefly, the polymer melt (e.g. adhesive) is extruded through a central orifice in the nozzle assembly 10 forming single filament 14. The air discharging through suitable passages contacts the filament and imparts a circular expanding motion thereto, illustrated as 16. The swirling filament is deposited on a moving substrate 17 in the form of a circular pattern illustrated in FIG. 2. The circular bead deposited on the substrate 17 in one cycle is displaced by a small amount in the direction of substrate movement from the loop deposited by the previous cycle. The pattern thus forms a straight line ribbon 18 having a width x defined by overlapping circular beads. The adhesive on the substrate can provide a number of applications. In FIG. 2, the adhesive is used to secure elastic strip 19 to a plastic sheet such as a diaper back sheet.

For quality control, it is important that the beads define the straight line within a relatively high degree of accuracy and that the beads be uniformly distributed. This quality is largely due to the control on the expanding cone 16 between the nozzle discharge and the substrate 17. The dimension x of the ribbon should vary within controlled tolerances.

An important feature of the present invention is to impose an outer air boundary which retains the inner expanding polymer cone 16 thereby avoiding irregularities in the flow pattern of the melt and undue variations in dimension x.

Another important feature of the invention is the linear speed of the formation of the ribbon. For economic operation, it is preferred to deposit the bead on the substrate 17 at 50,000 to 700,000 swirls (e.g. loops) per minute, preferably 100,000–500,000, and most preferably 150,000–300,000 swirls per minute.

Figure 5:
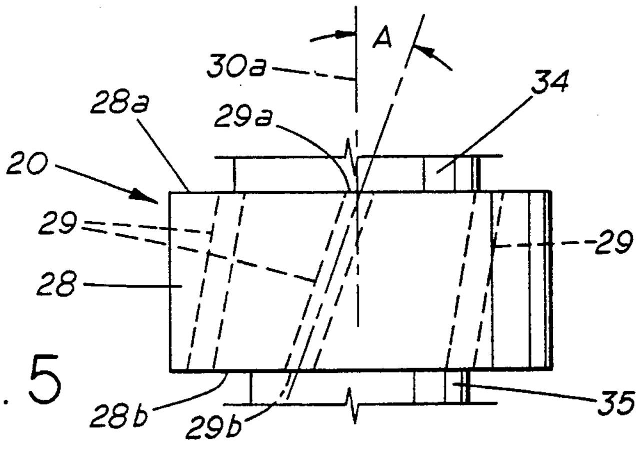
FIG. 5 is a side elevational view of a portion of the nozzle shown in FIG. 4, illustrating the angular disposition of the air passages.
Figure 7:
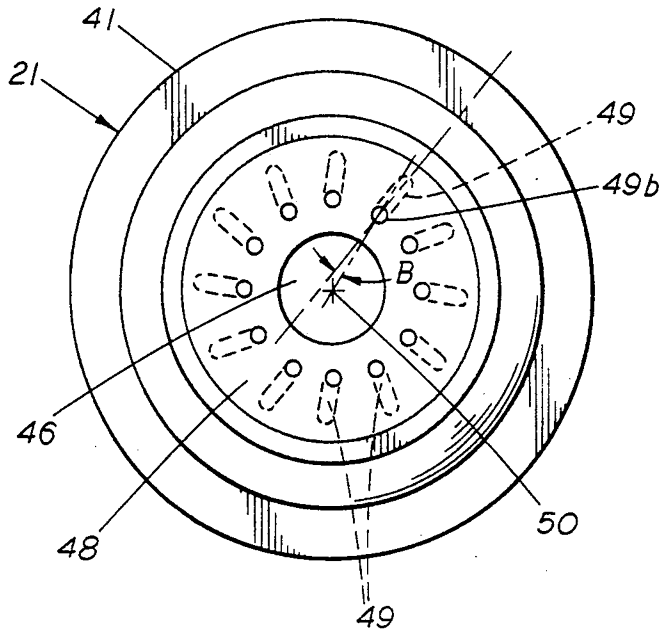
FIG. 7 is an end view of the nozzle cap shown in FIG. 6.
Figure 8:
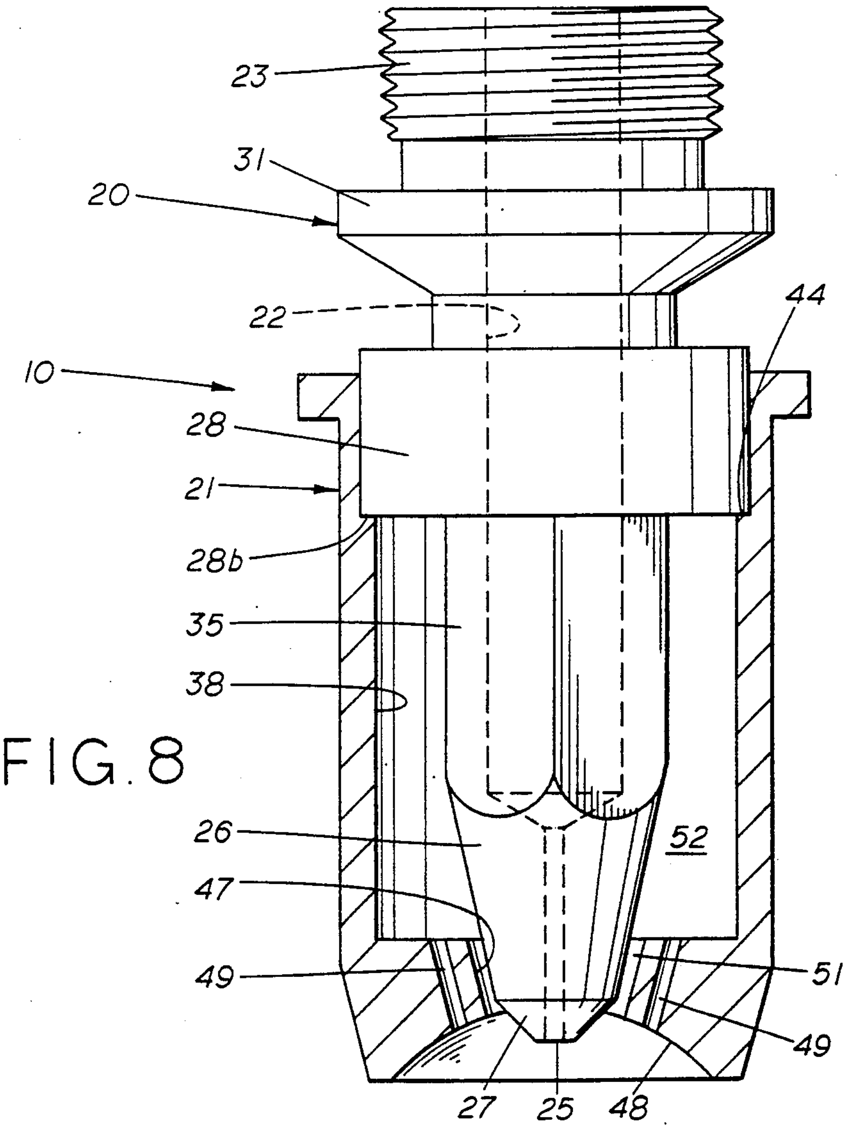
FIG. 8 is a side elevational view of the assembled nozzle with portions shown in section.
Figure 9:
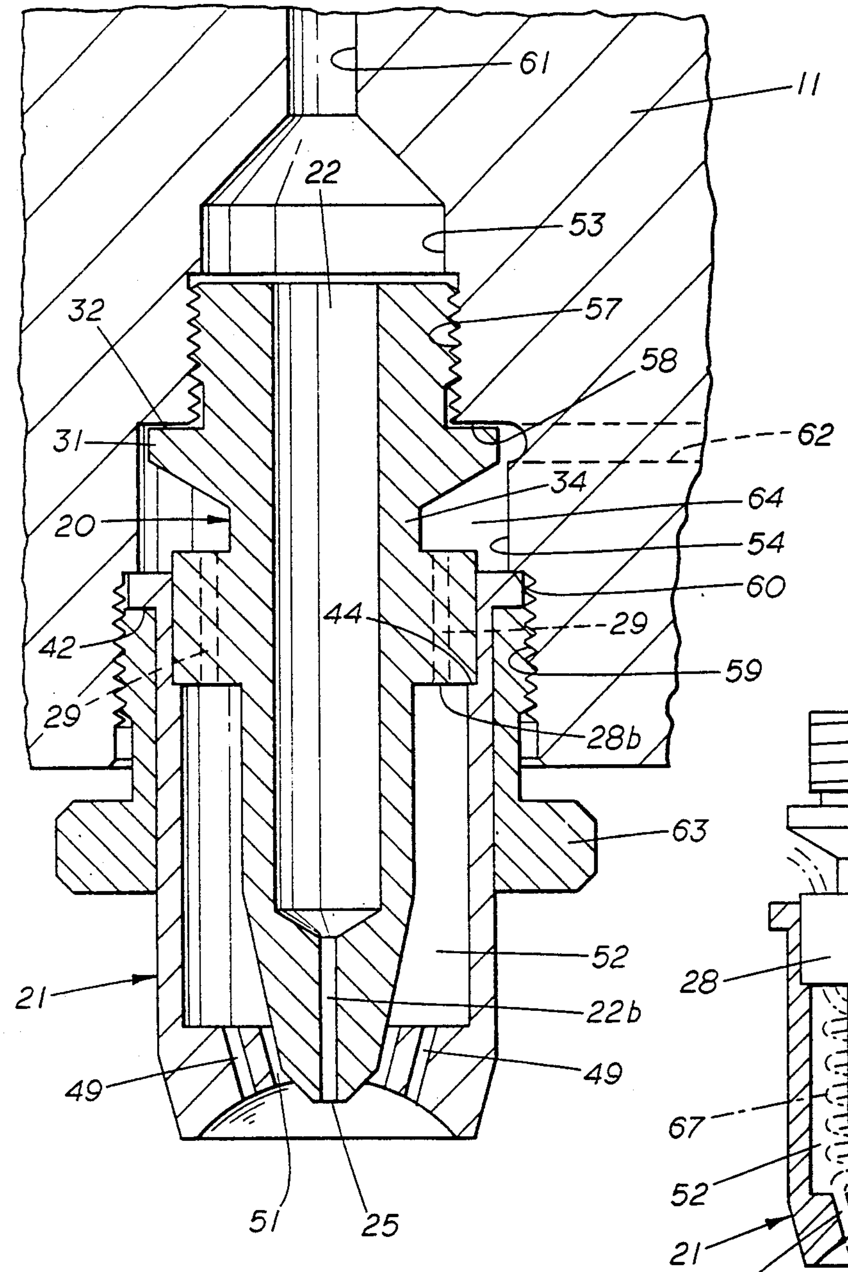
FIG. 9 is a view showing the assembly of FIG. 8 mounted in a system.

As best seen in FIG. 8, the nozzle assembly 10 comprises two main parts: a nozzle insert 20 and an air cap 21. The nozzle insert 20 will be described with reference to FIG. 3, 4, and 5 and the companion air cap 21, with reference to FIGS. 6 and 7.

NOZZLE INSERT

Figure 3:
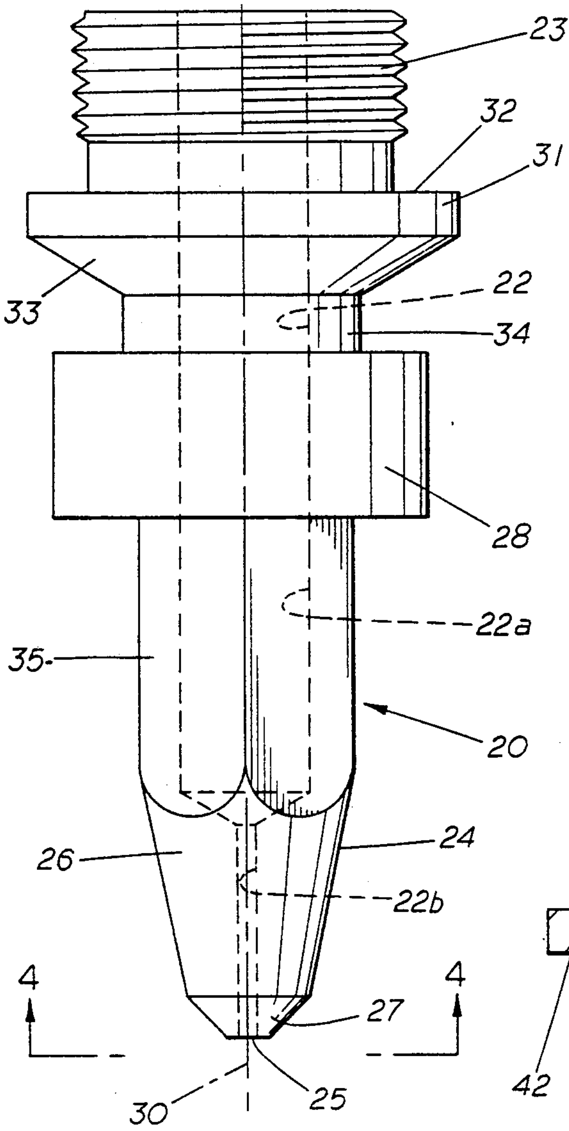
FIG. 3 is a side view of the nozzle insert for the nozzle assembly of the present invention.
Figure 4:
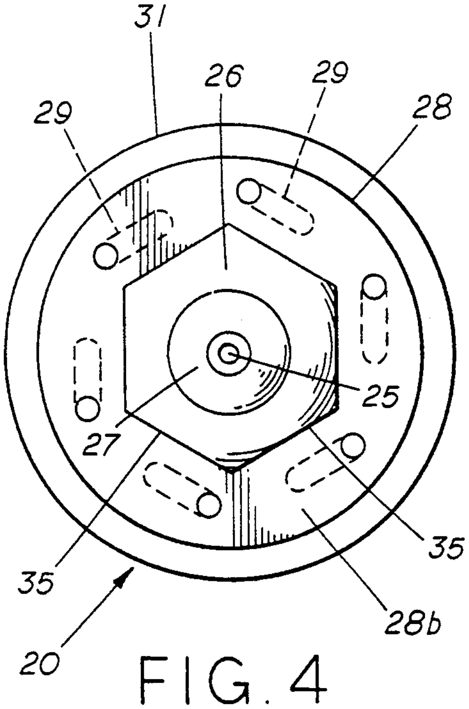
FIG. 4 is an end view (cutting plane 4—4 of FIG. 3) of the nozzle insert shown in FIG. 3.

Referring first to FIGS. 3 and 4, the nozzle insert 20 is an elongate steel member having a central passage 22 extending axially therethrough. One end of the insert 20 is threaded at 23 and the opposite end is tapered as at 24. The tapered end 24 is provided with a gradual tapered land section 26 and a tip section 27 which defines a larger tapered angle with respect to the axis 30 of nozzle 20.

The passage 22 includes large diameter section 22*a* which extends from the threaded end 23 to the tapered end 24 and a small diameter section 22*b* which extends through the tapered end 24. The small diameter passage 22*b* serves as the polymer orifice having outlet at 25. Polymer flowing through passage 22 is discharged as a filament at outlet 25.

A midsection of the nozzle 20 is provided with a flange 28 which has formed therein a plurality of air passages 29. A second flange 31 is also provided on the nozzle 20 at the base of threads 23 and is spaced axially from the first flange 28. The second flange 31 has a radially extending sealing surface 32 facing threaded section 23. The opposite side of the flange 31 is tapered a shown at 33 and the diameter of the nozzle insert 20 between the flanges 28 and 32 at 34 is substantially smaller than the outside diameters of either flange 28 and 31.

An intermediate surface between the tapered end 24 and the flange 28 may be provided with wrench flats 35 to assist in screwing the nozzle insert 20 into the mounting block 11.

As mentioned above and as best seen inn FIGS. 4 and 5, flange 28 has a plurality of air passages 29 extending therethrough, with the inlets 29*a* of each passage 29 being formed in flange surface 28*a* and outlets 29*b* penetrating flange surface 28*b*. The number of air passages formed in flange 28 may vary but it is preferred that from 6 to 12 air passages circumferentially spaced on the flange 28 at equal intervals be provided. The air passages 29 are inclined with respect to the axis 30 (see FIG. 3) of polymer passage 22. The angle A defined by the axis of passage 29 and a line 30*a* parallel to axis 30 passing through the center of inlet 29*a* of passage 29 is between 10° to 30°, preferably 15° to 25°, and most preferably 18° to 22°. The passage outlets 29*b* are positioned with respect to the inlets 29*a* so that the air discharged from passage 29 has an axial component and a longitudinal component whereby air jetting from the passage 29 swirls around nozzle section 35 as described in more detail below. The outlets 29*b* may be positioned at a radial distance from the nozzle axis about equal to that of inlets 29*a* or slightly (e.g. $\frac{1}{2}$ to 2 diameters of passage 29) radially offset therefrom as shown in FIG. 4.

AIR CAP

Figure 6:
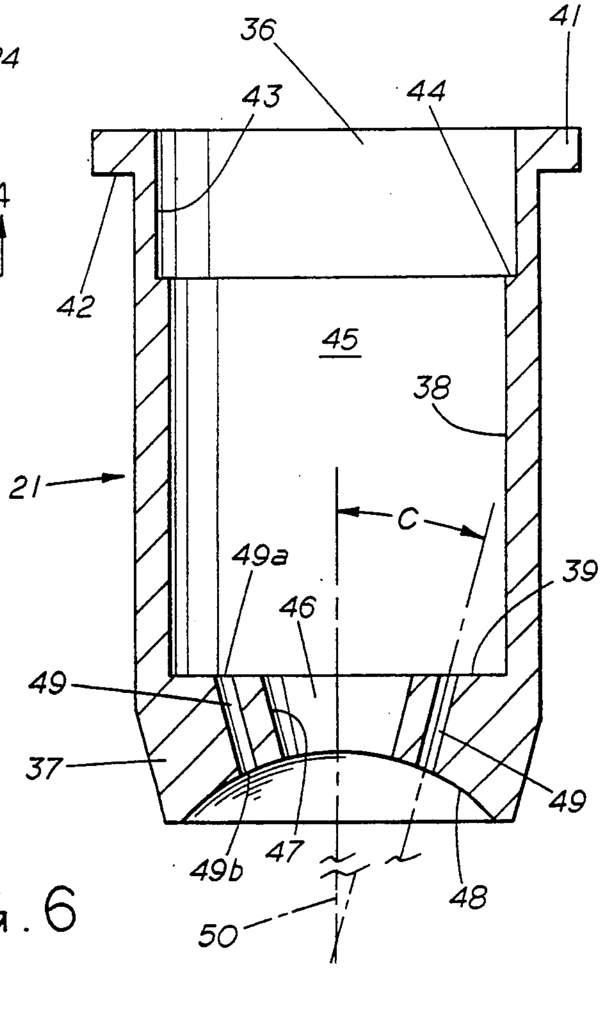
FIG. 6 is a side elevation of the air cap of the nozzle assembly constructed according to the present invention.

As shown in FIG. 6, the air cap 21 is shaped to cooperate with the nozzle insert 20 and is in the form of a hollow cylinder open at end 36 and partially closed at end 37. The interior of cap 21 is provided with cylindrical wall 38 and circular flat bottom surface 39. End 36 is provided with a flange 41 which defines radial sealing surface 42. End 36 is also counterbored at 43, which interconnects with wall 38 by annular shoulder 44. The circular wall 38 and bottom 39 define chamber 45. Cap end 37 has formed therein a central, downwardly converging land 47 which has the same general (±5°) taper as insert land 26. The conical shaped land 47 defines central opening 46 having axis 50, with cap 21 mounted on insert 20, lands 26 and 47 define a downwardly converging annular air passage 51 shown in FIG. 8. Axes 30 and 50 are coincident. Cap end 21 terminates in a concave surface 48. The purpose of concave surface 48 is to counteract turbulent air flow created at the exits of primary and secondary air passages which may influence the cone formation process.

Cap end 37 also has formed therein air passages 49 arranged in a ring radially outwardly of opening 46. The air passages 49 have inlets 49*a* in surface 39 and outlets 49*b* in the concave surface 48. As best seen in FIGS. 6 and 7, the direction of each air passage 49 are inclined inwardly, having a major components parallel to the axis 50 of central opening 46 and a minor component radially inwardly with respect to the axis 50. The passages 49 are slightly skewed (i.e. nonaligned) with respect to axis 50 so that air jets discharging therefrom are not focused on axis 50, but instead are directed within a few degrees on one side thereof. The skew angle B is illustrated in FIG. 7 as being the angle defined by a vertical plane passing through axis 50 and the center of passage outlet 49*b*, and the vertical plane passing through the axis of passage 49. The skew angle B may vary within a relatively broad range, depending on several factors including dimensions of the nozzle insert 20 and cap 21 and operating conditions. Preferably the skew angle should be between 5 to 20°, with 7 to 15° being most preferred.

The passages 49 also converge inwardly from surface 39 to surface 48. The axis of each passage 49 defines an angle C with a vertical line (parallel to axis 50) passing through the center of outlet 49*b*. Angle C may range from 15 to 25° preferably 10 to 20°, and most preferably 12 to 18°.

The downwardly converging land 47 is shaped as an inverted truncated cone whose sides define an angle between 10 to 20°, preferably 12 to 18°. Angle C preferably is within 5° of the converging angle defined by land 47.

NOZZLE ASSEMBLY

As shown in FIG. 8, the nozzle insert 20 fits into the air cap 21 with the tip 27 projecting slightly below a portion of the concave surface 48. A peripheral portion of flange surface 28*b* engages shoulder 44 of the cap and maintains the proper position of the tapered end 24 with respect of the die cap end 37. In this position, the land 26 of the nozzle insert 20 tapered end 24 is spaced radially inwardly from the land 47 of the air cap 21. This space defines an annular converging flow passage 51 for the air and serves as the primary air passage. In this assembled condition, an annular chamber 512 between the air cap wall 38 and portions 26 and 35 of the nozzle insert 20 and is in fluid communicating with annular passage 51 and air passages 49. The annular passage 51 converges at an included angle of 10 to 60°, preferably 20 to 40° and most preferably 24 to 34°.

In order to receive the nozzle insert 20, the mounting block 11 is provided with a bore 53 and counterbore 54. A bottom section 56 of the bore 53 is internally threaded as at 57 for receiving threaded end 23 of insert 20. The radial surface 58 interconnecting bore 53 and counterbore 54 is sized to engage seal surface 32 of flange 31. The mount of counterbore 54 is threaded at 59 and is slightly enlarged. Radial shoulder 60 interconnects the counterbore 54 and threaded section 59.

A polymer flow passage 61 is formed in the mounting block 11 and serves to conduct molten polymer or adhesive from extruder 12 to the nozzle flow passage 22. An air passage 62 is formed in the block 11 and conducts air to the nozzle assembly from line 13 (FIG. 1) leading to an air source. A threaded retaining nut 63 fits around cap 21 and has an end portion adapted to engage flange surface 42 of the air cap 21.

The nozzle assembly is mounted on block 11 by first screwing insert 20 into threads 57 until flange surface 32 sealingly engages shoulder 58. Bore wall 54 and the nozzle section 20 define an annular chamber 64. The cap 21 is then inserted into the threaded section 59 until flange 41 engages shoulder 60. The nut 63 then is tightened to a torque spec of 80–100 in/lbs (rather critical). The nut 63 is threaded to section 59 of the block bore 54 forces the upper edge of flange 41 into engagement with shoulder 60 and establishes a fluid seal therewith. Engagement of flange surface 28*b* on shoulder 44 establishes a fluid seal between chambers 52 and 64.

The mounting block 11 will generally be provided with heating elements to maintain the polymer and/or air at the desired temperatures.

Although the above construction for introducing the air into chamber 52 is preferred, other means for causing the air to swirl or spin in this component are possible. For example, the air can be introduced tangentially with the compartment 52 so that the air will swirl therein and swirl through annular opening 51. Internal baffles may also be used to impart the swirling motion to the air in chamber 52.

FILAMENT FORMING MATERIAL

The polymers useable in the present invention include those used in meltblowing, spunbond, melt spinning, and adhesive applications.

Preferably, the polymers are adhesive thermoplastic and spunbond and melt spinning thermoplastics. The polymer useable in adhesives include hot melt adhesives such as EVA's (e.g. 20–40 wt % VA). Conventional hot melt adhesives useable in the invention also include those disclosed in U.S. Pat. Nos. 4,497,941, 4,325,853, 4,650,829, and 4,315,842, the disclosure of which are incorporated herein by reference. Polymers used in coating applications may be generally the same as those used in spunbond or melt spinning.

The polymers useable in spunbonding and melt spinning include polyolefins (e.g. homopolymers and copolymers of ethylene and propylene), polyesters and nylons. Other filament forming materials include polyamide, cellulose acetate, PVA, poly (methyl methacrylate), styrene copolymers, and the like. Plasticisers, diluents and other additives may also be used in the polymers.

OPERATION

With the nozzle assembly 10 mounted on the mounting block 11, the operation may be carried out by flowing the molten polymer from the extruder 12 through flow passage 61, through nozzle passage 22 and through orifice 22*b*, discharging as a continuous filament at the apex (outlet 25) at the nozzle tip 27. Air from the air source is passed through line 13, through passage 62 into chamber 64, through primary passages 29 into chamber 52 and discharged through annular passage 51 and secondary air passages 49.

Figure 10:
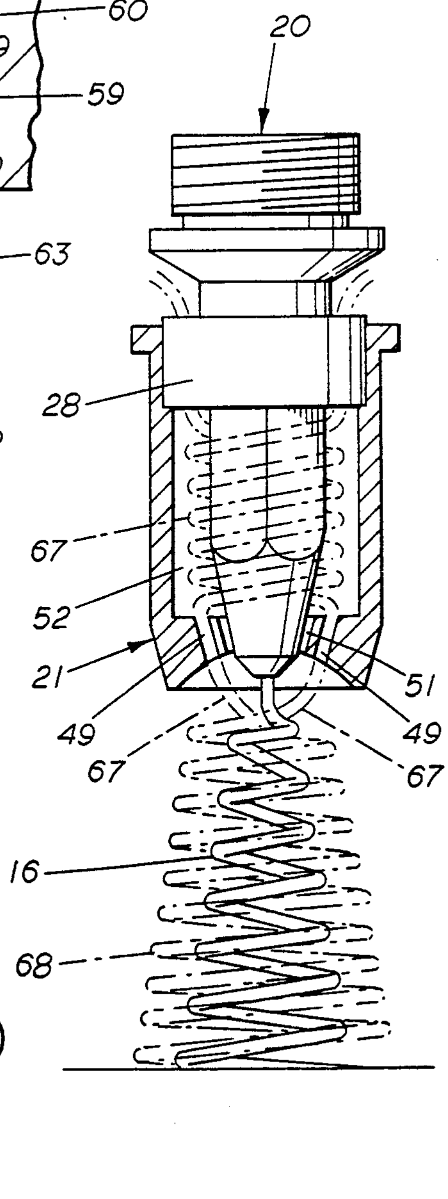
FIG. 10 is a schematic view illustrating the swirling melt discharged from the nozzle assembly.

As illustrated in schematic FIG. 10, the air flowing through the inclined primary passages 29 takes on a swirling motion (illustrated as 67) within chamber 52 so that the air flowing through annular passage 51 also in a swirling pattern. The air flowing through passage 51 is accelerated and upon exiting creates an expanding helical vortex (cone) and imparts spinning motion to the filament 16 to draw down the melt by drag forces. The filament is deposited on the substrate 17 as illustrated in FIGS. 1 and 2. At the same time, the air passing through the secondary air passages 49 forms a secondary helix flow pattern as schematically illustrated as 68 in FIG. 10 in the same direction of rotation as the expanding conical flow pattern 16 of the polymer melt. The secondary air jets form a boundary around the melt and accelerates and further draws down the filament in the primary cone 16. The secondary air jets accelerate the monofilaments from about 3 times its primary rotational speed, preferably from 5 to 15 times and most preferably from 8 to 12 times.

The flow passages 49, are inclined i the direction of helical motion and preferably should be focused on the expanding polymer helix at between 0.1 to 0.2 times the distance between the orifice outlet 25 and the substrate 17 or collector.

The secondary air jets also create a swirling boundary layer of air around the filament spiral 16, which limits outward expansion of the filament and thereby produces dimensional stability to the circular loops deposited on substrate 17 which define the ribbon 18.

The flow area ratio of annular passage 51 and the sum of passages 49, will depend on the space of annular passage 51 and the diameters of passages 49, as well as air pressure in chamber 52. In a typical system which the spacing of annular passage 51 ranges from 0.004" to 0.016", the flow area ratio of annular passage 51 to the sum of passages 49 should be from 0.2:1 to 2:1 preferably from 0.5:1 to 1.5:1, most preferably from 0.918:1.

Although the present invention can be used in any polymer spinning system, it is preferably used in any of hot melt adhesives. For the application in polymer spinning hot melt adhesives, the preferred dimensions of the nozzle are as follows

| | Broad Range | Preferred Range | Most Preferred Range | Best Mode |
|---|---|---|---|---|
| orifice size | .005-.080 | .010-.040 | .025"-.035" | 0.080" |
| Primary air passages | | | | |
| number | 3-15 | 4-12 | 4-8 | 6 |
| size | .010-.070" | .020-.060" | .030-.050" | 0.04" |
| angle A | 10-30° | 15-25° | 18-22° | 20° |
| radial spacing (center line of outlets) | .250-.750" | .350-.550" | .400-.500" | 0.45" |
| Secondary air passages | | | | |
| number | 4-24 | 8-16 | 10-14 | 12 |
| size (diameter) | .005-.050" | .010-.030" | .015-.025" | 0.020" |
| angle C | 5-45° | 7-15° | 9-12° | 10° |
| angle B | 5-25° | 7-20° | 10-16° | 15° |
| radial spacing (center line of outlets) | .100-.400" | .200-.300" | .240-.260" | 0.250" |
| Annular opening (spacing) | .002-.020" | .010-.016" | .012-.014" | 0.013" |
| Angle | 5°-30° | 10°-20° | 12°-17° | 15° |

-continued

| | Broad Range | Preferred Range | Most Preferred Range | Best Mode |
|---|---|---|---|---|
| (with cap axis) | | | | |
| Radial distance (outlet) | .040-.110 | .050-.100 | .070-.090 | 0.08 |

Preferably, the sum or the flow area of passages 29 is 2 to 8, preferably 4 to 6 times the flow area of passages 49.

It will be appreciated by those skilled in the art, however, that if the nozzle is used with other polymers, the dimensions may vary based upon several factors including type of polymer, operating temperature and pressure, and the intended application. It is preferred that the gas be hot air and that the hot gas contact the filament prior to substantial hardening to permit additional draw down (stretching) of the filament.

EXAMPLES

An apparatus for applying hot melt adhesives was constructed having the dimensions of the best mode described above.

The hot melt adhesive was a commercial adhesive (Findley H-2096) and the operating conditions were as follows:

| | | |
|---|---|---|
| polymer | | |
| pressure | 80 | psi |
| temperatures | 340° | F. |
| flow ratio | 30 | g/min |
| air | | |
| pressure | 10.5 | psi |
| temperatures | 380° | F. |

An adhesive bead was laid on a plastic backsheet (substrate) at a rate of 20 swirls per linear inch 1,000,000 swirls per minute producing a ribbon ⅝" in width (diameter of loop) and a bead of 150 microns (diameters). Other tests have produced deposition rates as high as 500,000 per minute.

In summary, the invention in its broadest process terms comprises the steps of (a) extruding a thermoplastic melt, preferably hot melt adhesive, through an orifice; (b) contacting the extruded melt by air passing through a converging annular air passage swirling in one direction to contact the monofilament and impart a rotation thereto in the form of an expanding swirling conocal vortex; and (c) discharging air from a plurality of inclined air passages surrounding the annular air passage to form a secondary air boundary around the swirling polymer melt vortex, the air in the secondary boundary swirling in the same direction and at a velocity substantially higher than the air discharging from the primary annular air passage and depositing a bead of polymer on a substrate in a moving circular pattern.

What is claimed is:

1. A nozzle assembly for use in a system for delivering a thermoplastic melt, said nozzle assembly comprising:

(a) a nozzle member having a nose portion and polymer melt passage extending therethrough and adapted to conduct a polymer, said polymer melt passage including an orifice extending through said nose portion for discharging a filament therefrom;

(b) a cap member mounted on said nozzle member and therewith defining an annular chamber, said cap member having an end portion which has formed therein (i) a central opening, and (ii) a plurality of gas passages circumferentially spaced around said central opening, said plurality of gas passages being substantially parallel to one another and inclined and skewed with respect to the axis of said opening;

said nose portion extending through said central opening and therewith defining a converging annular gas passage; and (c) means for introducing gas into said annular chamber to cause the gas to swirl therein and discharge through (i) said converging annular gas passage and (ii) said plurality of gas passages; whereby the filament discharging from said orifice is first contacted by swirling gas from said converging annular gas passage to impart a swirling motion of said filament and then by gas discharging from said plurality of gas passages, the inclination and skew of said plurality of gas passages be such to contact the swirling filament to increase its velocity.

2. The nozzle assembly as defined in claim 1 wherein the orifice has a diameter of 0.005 to 0.080 mm.

3. The nozzle assembly as defined in claim 1 wherein the annular passage converges at an included angle from 10 to 60° and has an annular spacing between 0.002 to 0.020 inches.

4. The nozzle assembly of claim 3 wherein the plurality of gas passages are parallel to each other and have a diameter of 0.005 to 0.050 inches.

5. The nozzle assembly of claim 4 wherein the ratio of the flow area of the annular passage to that of gas passages ranges from 0.2:1 to 2:1.

6. The nozzle assembly of claim 1 wherein each of the gas passages have a major direction component in a direction radially inwardly with respect to the nozzle axis, said radially inwardly component being skewed with respect to the radial direction of the nozzle axis whereby gas discharges from the plurality of air passages avoid the axis of the swirling filament.

7. The nozzle assembly of claim 6 wherein each of the plurality of gas passages are inclined at an angle, the angle defined by a vertical plane passing through the axis of each of said passages and a vertical line passing through the passage melt, said angle being between 5 to 45°.

8. The nozzle assembly of claim 6 wherein the skew angle is between 5 to 45°.

9. The nozzle assembly of claim 1 wherein the means for introducing gas into said annular chamber comprises (a) an inlet chamber extending circumferentially around a mid section of said nozzle insert;

(b) a flange separating said inlet chamber from said annular chamber;

(c) a plurality of gas passages formed in said flange circumferentially around said nozzle insert interconnecting said inlet chamber and said annular chamber, said plurality of gas passages being substantially parallel and inclined so that gas discharging therefrom swirls in said annular chamber.

10. The nozzle assembly as defined in claim 9 wherein the sum of the flow area of said flange gas passages is 4:1 to 6:1 the sum of the gas passages formed in the cap member.

11. The nozzle assembly of claim 9 wherein the flange air passage having a major directional component in the direction of the nozzle axis and a minor component generally tangentical with respect thereto.

12. A nozzle assembly for generating a filament forming material which comprises (a) a nozzle member having a central passage formed therein and having an inlet end and a discharge end, said passage includes an orifice at the discharge end thereof, (b) an annular air chamber surrounding said nozzle member and having (i) an outlet in a form of an converging annular air passage around the orifice discharge end and (ii) a plurality of air holes circumferentially spaced around the annular air passage;

(c) means for flowing a fiber forming liquid through the central passage and discharge the same from said orifice as a filament to form a filament;

(d) means for flowing air into the air chamber;

(e) means for flowing air from the air chamber through the annular passage in a swirling motion to contact and impart a swirling motion to the fiber forming liquid discharged from the orifice, said air holes being inclined and directed to cause air jetting therefrom to contact the swirling filament and increase the velocity thereof in the swirling direction; and (f) means for depositing the swirling filament into the substrate or collector.

13. In a method of producing a filament of thermoplastic material wherein a thermoplastic melt is extruded substantially through an orifice to form a filament, the improvement wherein the filament is contacted by a swirling converging gas from an annular gas passage surrounding said orifice to impart a swirling expanding helical motion to the filament; and thereafter contacting the filament with a plurality of gas streams at locations down stream of the initial contact by the swirling gas, said gas streams being equally spaced about the extrusion axis and directed at a skew angle with respect to the extrusion axis, said skew angle having a directional component in the direction of the swirling motion to increase the velocity of the filament moving in the helical pattern and thereby drawn down the filament.

14. The method of claim 13 wherein the swirling gas and gas streams causes the filament to swirl jets from 50,000 to 70,000 circular swirls per minute.

15. The method of claim 14 wherein the thermoplastic is selected from homopolymers and copolymers of a polyolefin.

16. The method of claim 14 wherein the final drawdown diameter of the filament is from 0.5 to 800 microns.

17. A method of applying an adhesive to a substrate which comprises (a) extruding an adhesive through an orifice to form a filament;

(b) contacting the extruded filament with a continuous annular gas convergingly swirling around said filament to impart a swirling motion to said filament, said motion being in the form of an expanding helix;

(c) thereafter contacting the filament in the swirling motion with a plurality of gas streams having a directional component in the direction of swirling motion to increase the velocity of the filament in the swirling motion and to further draw down the filament; and (d) depositing the filament on a moving substrate in a circular pattern, each circle being linearly displaced from each other and therewith defining a linear ribbon.

18. The method of claim 17 wherein the adhesive is a hot melt adhesive, and said drown down filament has an average diameter of 1 to 500 microns and being deposited on said substrate at 50,000 to 700,000 circles per minute.

19. The method of claim 18 wherein the flow ratio of the polymer to gas is 100 to 5,000 cc gas per g. polymer.

20. The method of claim 19 wherein the orifice diameter is from 0.005 to 0.080 inches.

21. The method of claim 20 wherein the orifice diameter is from 0.5 to 1 mm and said drown down filament has a diameter of 30 to 100 microns and said filament is deposited on said substrate at a speed of 100,000 to 500,000 circles/min.

22. A system for extruding a thermoplastic filament in a circular pattern, said system comprising:

(a) a nozzle insert member having a central passage extending therethrough terminating in a tapered end and having an orifice in said tapered end.

(b) means for delivering molten thermoplastic polymer to said passage and extruding a filament from said orifice;

(c) a first annular compartment surrounding a mid section of said insert member;

(d) a cap member mounted around said insert member and therewith defining
  (i) a second annular compartment, and
  (ii) a converging annular opening surrounding said orifice, and
  (iii) a plurality of gas flow passages circumferentially spaced about said annular opening;

(e) means for delivering gas to said first compartment;

(f) means for delivering gas from said first compartment into said second compartment in a swirling flow pattern whereby gas flows through said annular opening in a swirling direction and contacts the thermoplastic filament imparting a swirling helical motion thereto, said plurality of gas passages being oriented in a direction to contact the swirling thermoplastic filament to increase the velocity of the filament in the expanding spiral pattern and further draw down the filament; and (g) collector means for receiving said filament in a substantially circular pattern, said collector means being movable across the axial direction of said orifice wherein the filament is collected as a series of overlaping circular loops forming a ribbon thereon.

23. The system as defined in claim 22 wherein the thermoplastic is an adhesive and the collector means is a substrate.

* * * * *